June 5, 1962    J. J. KUPCHICK    3,037,827
BALL BEARING WITH RESILIENT RETAINERS
Filed April 13, 1959
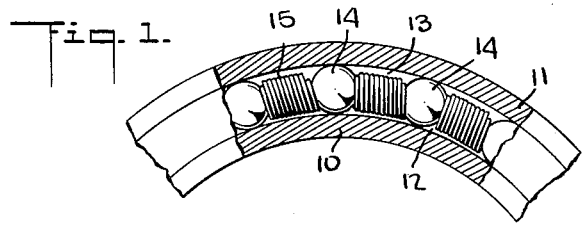
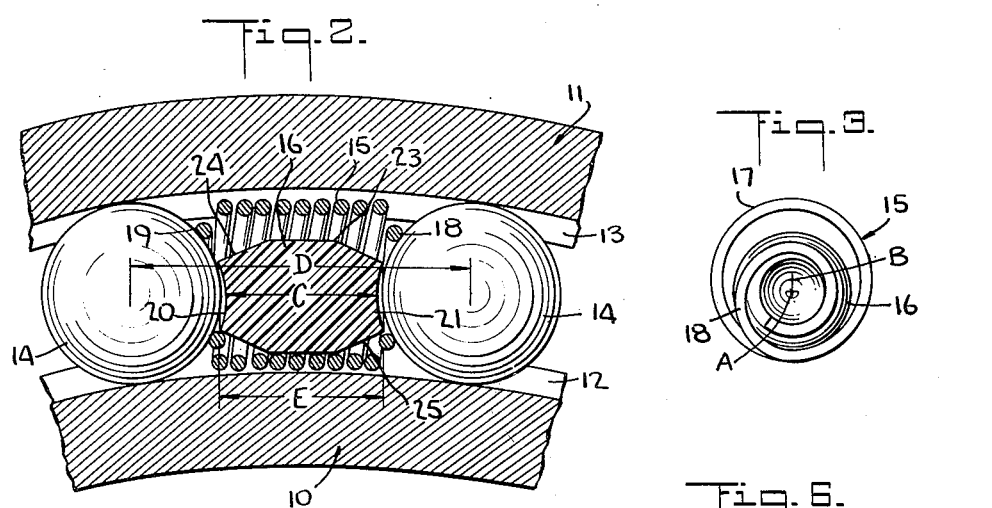
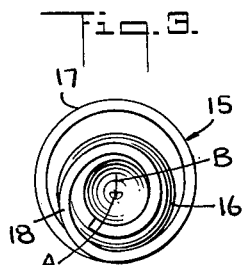
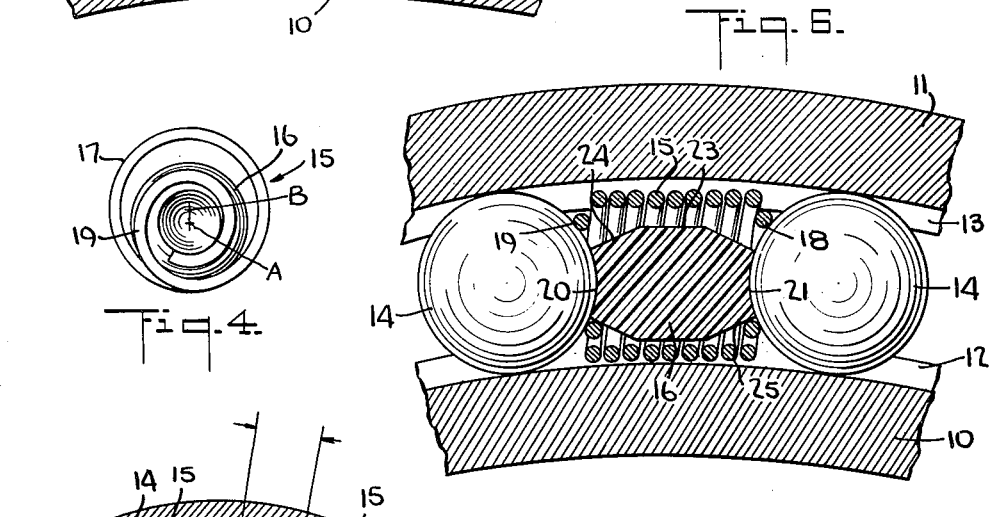
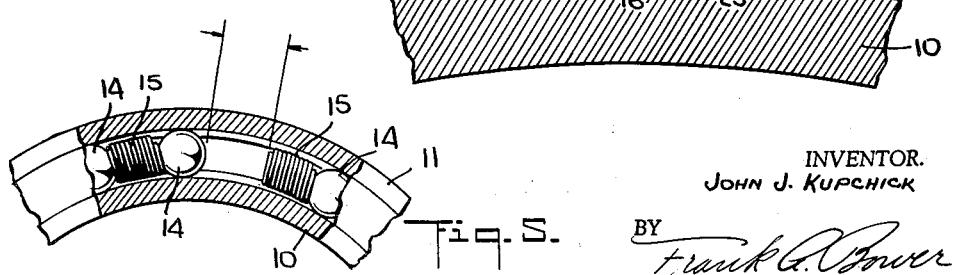
INVENTOR.
JOHN J. KUPCHICK
BY Frank A. Bower
his ATTORNEY

United States Patent Office 3,037,827
Patented June 5, 1962

3,037,827
BALL BEARING WITH RESILIENT RETAINERS
John J. Kupchick, Forestville, Conn., assignor to Marlin-Rockwell Corporation, Jamestown, N.Y., a corporation of Delaware
Filed Apr. 13, 1959, Ser. No. 806,085
2 Claims. (Cl. 308—199)

This invention relates to retainers for ball bearings and is directed particularly to resilient-type retainers.

In order to reduce the frictional torque of retainers it is well-known to substitute the rigid-type retainer by a resilient, compressible-type which is usually in the form of coiled springs. One of the disadvantages of this spring-type retainer is that the spacing between the bearing balls will vary over a considerable length as the load on the balls varies with rotation of the race. This uneven spacing may cause a disassembly of the bearing.

An object of the invention is to provide resilient-type retainers with low frictional torque and a limited separation of the balls.

Another object of the invention is to produce a more stable low torque ball bearing.

Other and further objects of the invention will become apparent from the following description of the invention taken in connection with the drawings, in which—

FIG. 1 is a side view of a segment of the ball bearing with resilient retainers in accordance with the invention;

FIG. 2 is an enlarged fragmentary sectional view of the bearing through the center of the bearing;

FIG. 3 is a view of one end of the spring retainer and the spacer;

FIG. 4 is a view of the other end of the spring retainer and the spacer;

FIG. 5 is a fragmentary view to illustrate the maximum separation when all the spacers are contacting balls; and FIG. 6 is an enlarged fragmentary sectional view through the center of the bearing illustrating the spacer in contact with adjacent balls.

Referring to the drawings, the bearing comprises inner and outer rings 10 and 11 with rows of raceways 12 and 13 respectively. Spherical bearing balls 14 are positioned in the races. The raceways and balls are of conventional design. The bearing balls are positioned by individual mounted elements between each ball. A helical or coil spring 15 and a spacer 16 are located between each set of balls.

The helical spring comprises coils of round spring wire. The intermediate coils 17 preferably have the same diameter to form a cylindrical shape. The end coils 18 and 19 have a smaller diameter and form seating surfaces for the bearing balls 14. The coils 17 have a diameter slightly less than the diameter of the bearing balls and extend into the races. The end coils 18 and 19 as illustrated in FIGS. 3 and 4 have a sharper curvature than the coils 17. The end coils 18 and 19 are illustrated in FIGS. 3 and 4 as turning to a lesser diameter and hooking over the side of the ball and seating against the ball. The end turn is spaced from the spacer to permit the spacer 16 to contact the ball. The ball seats against the length of the end coil. The coils 18 and 19 extend from the bottom or inner side of the spring so that the lower portion is co-incident with the coils 17. Portions of the coils 18 and 19 are radially within the outer portion of the coils 17. The center A of the spacer 16 is displaced inwardly slightly from the center B of the coils 17. The end coils 18 and 19 rest on the balls 14 and position the balls and spring in relation to one another. The axis of the coils 17 is radially outward from the axis of the spacer to compensate for the curvature of the inner race. The inner portion of the spring is located adjacent to the inner race but not in contact therewith. The spring resiliently spaces the bearing balls and provides a low frictional torque.

The springs are made of light gage wire so that they are light and flexible. This light flexible characteristic produces a bearing having a low torque characteristic. The flexibility permits the spring to be temporarily deformed or misshapened to assumed an elliptical form for easy insertion between the inner and outer rings of the bearing.

The spacers 16 are cylindrical in shape and are made of solid nylon. The spacers are located within the coils of the spring and have concave end surfaces 20 and 21. The axial length C between the bottom of the concave surfaces of the spacer is less than the distance between the balls when evenly spaced a distance D between centers or when the balls are separated by the normal pressure of the spring. The axial length E of the ends is greater than the normal, even distance between the balls.

The cylindrical surfaces 23 of the spacers have a diameter greater than the inner diameter of the end coils. The spacers are inserted within the springs through the end coils. The diameter is also less than the space between the rings. When the balls are all seated in the spacers the remaining space is approximately equal to one and three-fifths of the short length of the spacer. This leaves ample room for the insertion of the last spacer between the rings. The compression of the springs evenly distributes the balls and springs around the races and retains the balls in the ring, preventing disassembly of the bearing. When the balls are seated in the concave surfaces there is still a compressibility in the spring. Thus, there is a substantial force applied to the balls urging them to an even distribution in the bearing.

The edges 24 and 25 are tapered to avoid snaring of the spacer on the turns of the spring and provide for the easy insertion of the spacer in the spring. As illustrated in FIGS. 2 and 6 the spacer in the non-seated position may be out of alignment with the seated position. When the space between the balls is reduced and the spacer is contacted, the spacer moves radially outward to seat the balls in the respective concave surfaces. The spacer may sit in the coils 17 and not against the balls without radial movement. The longitudinal axis of the seated spacer will be approximately collinear with the chord drawn from center to center of the two contacted balls.

The combination of the spacers and the springs maintains a better distribution of the balls around the bearing. The spacer provides a minimum distance which two balls can approach one another. Thus, as load is applied the balls move into contact with the spacers and thus maintain a distribution of the balls. The maximum number of balls over a given arc is at a minimum. The balls in the remaining area will tend to also evenly distribute themselves under the pressure of the springs. There is a circumferential distribution of the balls around the bearing between a minimum spacing and a controlled maximum spacing. The spacing of the balls does not vary over too great a range. This limitation in resilient types of retainers not only prevents disassembly of the bearing but also reduces the relative sliding movement of the bearings in relation to the rings and maintains a rolling contact.

The bearing may be assembled by placing the balls and retaining springs in the outer ring and forcing the inner ring into place. The spacers may then be inserted into position within the springs. As indicated in FIG. 5, sufficient space is left between the ball and spring to permit the insertion of the last spacer. The balls and springs then assume their normal distribution in the inner and outer races.

Various modifications and changes may be made in the foregoing bearing without departing from the invention as set forth in the appended claims.

I claim:
1. A ball bearing comprising inner and outer rings with inner and outer races, bearing balls circumferentially distributed in said races, retaining means comprising springs of generally helical form extending between the bearing balls and having end convolutions of sharper curvature directly engaging said balls to separate the balls under predetermined resilient pressures of said convolutions on the balls, and relatively short and rigid spacers carried by said end convolutions of said springs between said balls and having end surfaces adapted to directly engage against the said balls to maintain separation thereof upon predetermined compression of corresponding springs by action of the balls in service, the spacer end contacts being applied to ball areas different from and within those of the spring convolutions.

2. A ball bearing comprising inner and outer rings with inner and outer races, bearing balls circumferentially distributed in said races, retaining means comprising springs of generally helical form extending between the bearing balls and having end convolutions directly engaging said balls to separate the balls under predetermined resilient pressures of said convolutions on the balls, and relatively short and rigid spacers carried within said springs between said balls and having end surfaces adapted to directly engage against the said balls to maintain separation thereof upon predetermined compression of corresponding springs by action of the balls in service, the spacer end contacts being applied to ball areas within and surrounded by those of the spring convolutions.

References Cited in the file of this patent

UNITED STATES PATENTS

| | | |
|---|---|---|
| 821,461 | Conrad | May 22, 1906 |
| 824,820 | Riebe | July 3, 1906 |
| 1,015,441 | Hess | Jan. 23, 1912 |
| 2,665,958 | Waldherr | Jan. 12, 1954 |
| 2,827,345 | Zeilman | Mar. 18, 1958 |
| 2,893,791 | Von Mehren | July 7, 1959 |
| 2,893,792 | Wikoff et al. | July 7, 1959 |